United States Patent

(12) United States Patent
Shin et al.

(10) Patent No.: US 12,741,495 B2
(45) Date of Patent: Sep. 22, 2026

(54) MOBILE ROBOT AND METHOD OF CONTROLLING THE SAME

(71) Applicants: Hyundai Motor Company, Seoul (KR); Kia Corporation, Seoul (KR)

(72) Inventors: Hyeon Sik Shin, Hwaseong-si (KR); Joo Young Chun, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 6 days.

(21) Appl. No.: 18/936,339

(22) Filed: Nov. 4, 2024

(65) Prior Publication Data

US 2026/0027861 A1 Jan. 29, 2026

(30) Foreign Application Priority Data

Jul. 26, 2024 (KR) ........................ 10-2024-0099655

(51) Int. Cl.
*B60G 3/28* (2006.01)
*B25J 5/00* (2006.01)
*B25J 9/16* (2006.01)
*B60G 15/02* (2006.01)

(52) U.S. Cl.
CPC ................ *B60G 3/28* (2013.01); *B25J 5/007* (2013.01); *B25J 9/1664* (2013.01); *B60G 15/02* (2013.01); *B60G 2200/144* (2013.01)

(58) Field of Classification Search
CPC .... B60G 3/28; B60G 15/02; B60G 2200/144; B25J 5/007; B25J 9/1664
See application file for complete search history.

(56) References Cited

U.S. PATENT DOCUMENTS

| | | | | |
|---|---|---|---|---|
| 10,766,324 B1* | 9/2020 | Ebrahimi Afrouzi .. | B60G 3/145 |
| 2006/0095169 A1* | 5/2006 | Minor .................. | G05D 1/0293 701/23 |
| 2014/0138168 A1* | 5/2014 | Steltz ................... | B62D 55/112 180/9.1 |
| 2016/0303736 A1* | 10/2016 | Setsuda .................. | B25J 9/1602 |

(Continued)

FOREIGN PATENT DOCUMENTS

| | | |
|---|---|---|
| JP | 2014046890 A | 3/2014 |
| JP | 2020111191 A | 7/2020 |

(Continued)

*Primary Examiner* — Donald J Wallace
*Assistant Examiner* — Jalal C Coduroglu
(74) *Attorney, Agent, or Firm* — Slater Matsil, LLP

(57) ABSTRACT

In a method of controlling a mobile robot, the robot can include a body, wheels provided at one side of the body, link members and spring members configured to connect the body and the wheels, a drive motor configured to provide rotational driving power for rotating the wheels, and a steering motor configured to provide steering driving power for steering the wheels, in which the spring member is configured to be elastically deformed by a change in position of the link member relative to the body. The method can include modeling a spring property by deriving a relationship between the drive motor and the spring member, and deriving a relationship between the steering motor and the spring member, deriving output values for the drive motor and the steering motor, and driving the robot by controlling the drive motor and the steering motor using the derived output values.

19 Claims, 7 Drawing Sheets

(56) References Cited

U.S. PATENT DOCUMENTS

2017/0124230 A1* 5/2017 Liu .......................... G06F 17/16
2019/0184742 A1* 6/2019 Kwa ...................... B62D 21/18
2020/0047627 A1* 2/2020 Moon ..................... B60L 15/20
2021/0331542 A1* 10/2021 Ye ............................ B60G 3/14
2021/0387499 A1* 12/2021 Ko ........................... B62D 9/04
2022/0073136 A1 3/2022 Min
2022/0203823 A1 6/2022 Choi et al.
2024/0383358 A1* 11/2024 Lee ........................ B25J 11/008

FOREIGN PATENT DOCUMENTS

KR 20050076362 A 7/2005
KR 20190087018 A 7/2019
KR 20220093763 A 7/2022

* cited by examiner

MOBILE ROBOT AND METHOD OF CONTROLLING THE SAME

CROSS-REFERENCE TO RELATED APPLICATIONS

This application claims priority to and the benefit of Korean Patent Application No. 10-2024-0099655 filed in the Korean Intellectual Property Office on Jul. 26, 2024, the entire contents of which are incorporated herein by reference.

TECHNICAL FIELD

The present disclosure relates to a mobile robot and a method of controlling the same.

BACKGROUND

Among mobile robots that travel on a ground surface, a mobile robot equipped with a wheel generally includes a wheel drive motor configured to operate the wheel, and a wheel steering motor configured to steer the wheel. The mobile robot controls the wheel drive motor and the wheel steering motor in response to external instructions related to velocities, acceleration, turning directions/angles, and the like, thereby coping with various situations occurring during a process in which the mobile robot travels. In particular, the mobile robot including the wheel often includes a separate posture control means capable of maintaining the mobile robot in parallel with the ground surface regardless of a state of the ground surface. The posture control means may be broadly classified into: i) a case in which a separate power source (e.g., a motor) is mounted to actively adjust a height of a wheel relative to a body and ii) a case in which an elastic body, such as a spring, is used to passively adjust a relative height of a wheel.

SUMMARY

The present disclosure relates to a mobile robot and a method of controlling the same, and more particularly, to a mobile robot including a wheel and an elastic body and a method of controlling the same.

An embodiment of the present disclosure can provide a control method capable of maintaining a body of a mobile robot in parallel with a ground surface regardless of a shape of the ground surface during a process in which the mobile robot mounted with a wheel and an elastic body, such as a spring, travels.

To achieve the above-mentioned advantages, an embodiment of the present disclosure can provide a method of controlling a mobile robot, which can include a body, a plurality of wheels provided at one side of the body, link members and spring members configured to connect the body and the wheels, a drive motor configured to provide rotational driving power for rotating the wheels, and a steering motor configured to provide steering driving power for steering the wheels, in which the spring member is configured to be elastically deformed by a change in position of the link member relative to the body, and the method can include: a spring property modeling step of deriving a relationship between an electric current value of the drive motor and a displacement amount of the spring member and a relationship between a rotation angle of the steering motor and the displacement amount of the spring member; an output value derivation step of deriving an output value of the drive motor and an output value of the steering motor on the basis of the relationship derived in the spring property modeling step when an instruction related to a movement of the mobile robot is provided; and a driving step of controlling the drive motor and the steering motor on the basis of the output value derived in the output value derivation step.

The output value derivation step may include calculating an equation of a horizontal force or an equation of a moment of force of the mobile robot in response to an instruction related to a velocity, an acceleration, and a turning angle provided to the mobile robot.

When an operation direction of the wheel among horizontal directions of the mobile robot is defined as direction d and a direction perpendicular to direction d among the horizontal directions of the mobile robot is defined as direction s, the equation of the horizontal force and the equation of the moment of force calculated in the output value derivation step may be defined as follows, $$[A_{H1}\ \ A_{H2}\ \ A_{H3}\ \ A_{H4}][F_h]^T = \begin{bmatrix} M_b a_x \\ M_b a_y \\ I_{zz}\alpha \end{bmatrix}$$

(hereinafter, 'Equation 1'), (In Equation 1, $$A_{H1} = \begin{bmatrix} c_i & -s_i \\ s_i & c_i \\ p_{iy}c_i + p_{ix}s_i & -p_{iy}s_i + p_{ix}c_i \end{bmatrix},$$

$[F_H]=[F_{d1}\ F_{s1}\ \ldots\ F_{d4}\ F_{s4}]$, $c_1=\cos(\delta_i)$, $s_i=\sin(\delta_i)$, $M_b$ represents mass of the mobile robot, $a_x$ represents an acceleration in direction x among the horizontal directions of the mobile robot, $a_y$ represents an acceleration in direction y perpendicular to direction x among the horizontal directions of the mobile robot, $p_i$ represents a distance from a center of the mobile robot toward each of the wheels, $I_{zz}$ represents a moment of inertia based on a z-axis extending from the center of the mobile robot and extending in direction z perpendicular to direction x and direction y, $\alpha$ represents a rotational angular acceleration of the mobile robot based on the z-axis, $\delta_i$ represents a steering angle of the wheel, $F_d$ represents rotational driving power for the wheel generated by the drive motor, $F_s$ represents steering driving power for the wheel generated by the steering motor, and numbers of subscripts represent the wheels provided in the mobile robot).

The output value derivation step may include calculating an equation of a vertical force or an equation of a moment of force of the mobile robot in response to an instruction related to a velocity, an acceleration, and a turning angle provided to the mobile robot.

The wheels may include: a first wheel and a second wheel provided to face each other with the body interposed therebetween; and a third wheel and a fourth wheel provided to face each other with the body interposed therebetween, and when a direction in which the first wheel and the second wheel face each other is defined as direction a1 and a direction in which the third wheel and the fourth wheel face each other is defined as direction a2, the equation of the vertical force and the equation of the moment of force may be defined as follows in the output value derivation step, $$-F_{z1}r_1 + F_{z2}r_2 + F_{t1}^{a1}h_1 + F_{t2}^{a1}h_{2+} + F_{n3}^{a2}h_3 + F_{n4}^{a2}h_4 = M_{a1}$$

(hereinafter, 'Equation 2-1'), (In Equation 2-1, $F_z$ represents a force applied to the wheel in the vertical direction by a ground surface, $F_t^{a1}$ represents a force applied to the first wheel or the second wheel in direction a1 by the ground surface, $F_n^{a2}$ represents a force applied to the third wheel or the fourth wheel in direction a1 by the ground surface, r represents a horizontal distance between a portion of the wheel, which is in contact with the ground surface and the center of the mobile robot, h represents a vertical distance between the portion of the wheel, which is in contact with the ground surface, and the center of the mobile robot, $M_{a1}$ represents a moment of force applied to the mobile robot in direction a1).

The output value derivation step may be set to satisfy the following equation, $$k(\Delta\theta_2 - \Delta\theta_1) = M_{a1}$$

(hereinafter, 'Equation 2-2'), (In Equation 2-2, k represents an elastic modulus of the spring member, and Δθ represents the displacement amount of the spring member).

The equation of the vertical force and the equation of the moment of force calculated in the output value derivation step may be additionally defined as follows, $$-F_{z3}r_3 + F_{z4}r_4 + F_{t3}^{a2}h_3 + F_{t4}^{a2}h_{4+} + F_{n1}^{a1}h_1 + F_{n2}^{a1}h_2 = M_{a2}$$

(hereinafter, 'Equation 2-3'), (In Equation 2-3, Faz represents a force applied to the first wheel or the second wheel in direction a1 by the ground surface, $F_n^{a1}$ represents a force applied to the third wheel or the fourth wheel in direction a1 by the ground surface, and $M_{a2}$ represents a moment of force applied to the mobile robot in direction a2).

The output value derivation step may be additionally set to satisfy the following equation, $$k(\Delta\theta_4 - \Delta\theta_3) = M_{a2}$$

(hereinafter, 'Equation 2-4').

The output value derivation step may further include rotationally converting values of $F_t^{a1}$, $F_t^{a2}$, $F_t^{a2}$, and $F_n^{a1}$ into $F_d$ and $F_s$.

The first wheel, the second wheel, the third wheel, and the fourth wheel may be respectively provided in regions that are rotationally symmetrical at 45 degrees with respect to the center of the mobile robot, and the output value derivation step may further include rotationally converting values of $F_t^{a1}$, $F_t^{a2}$, $F_n^{a2}$, and $F_n^{a1}$ into $F_d$ and $F_s$ by use of the following equations, $$\begin{bmatrix} F_{ti}^{a1} \\ F_{ni}^{a1} \end{bmatrix} = \begin{bmatrix} \cos(\delta_i + \pi/4) & -\sin(\delta_i + \pi/4) \\ \sin(\delta_i + \pi/4) & \cos(\delta_i + \pi/4) \end{bmatrix} \begin{bmatrix} F_{di} \\ F_{si} \end{bmatrix} = \begin{bmatrix} c_i^{a1} & -s_i^{a1} \\ s_i^{a1} & c_i^{a1} \end{bmatrix} \begin{bmatrix} F_{di} \\ F_{si} \end{bmatrix}$$

(hereinafter, 'Equation 3-1') when i is 1 or 2, $$\begin{bmatrix} F_{ti}^{a2} \\ F_{ni}^{a2} \end{bmatrix} = \begin{bmatrix} \cos(\delta_i - \pi/4) & -\sin(\delta_i - \pi/4) \\ \sin(\delta_i - \pi/4) & \cos(\delta_i - \pi/4) \end{bmatrix} \begin{bmatrix} F_{di} \\ F_{si} \end{bmatrix} = \begin{bmatrix} c_i^{a2} & -s_i^{a2} \\ s_i^{a2} & c_i^{a2} \end{bmatrix} \begin{bmatrix} F_{di} \\ F_{si} \end{bmatrix}$$

(hereinafter, 'Equation 3-2') when i is 3 or 4.

The output value derivation step may further include defining the following equations by applying Equations 2-2, 2-4, 3-1, and 3-2 to Equations 2-1 and 2-3, $$-F_{z1}r_1 + F_{z2}r_2 + (c_1^{a1}F_{d1} - s_1^{a1}F_{s1})h_1 + (c_2^{a1}F_{d2} - s_2^{a1}F_{s2})h_2 + (s_3^{a2}F_{d3} + c_3^{a2}F_{s3})h_3 + (s_4^{a2}F_{d4} + c_4^{a2}F_{s4})h_s = k(\Delta\theta_2 - \Delta\theta_1)$$

(hereinafter, 'Equation 4-1'), $$-F_{z3}r_3 + F_{z4}r_4 + (s_1^{a1}F_{d1} + c_1^{a1}F_{z1})h_1 + (s_2^{a1}F_{d2} + c_2^{a1}F_{s2})h_2 + (c_3^{a2}F_{d3} - s_3^{a2}F_{z3})h_3 + (c_4^{a2}F_{d4} - s_4^{a2}F_{s4})h_s = k(\Delta\theta_4 - \Delta\theta_3)$$

(hereinafter, 'Equation 4-2'), $$F_{z1} + F_{z2} + F_{z3} + F_{z4} = \text{mg}$$

(hereinafter, 'Equation 4-3').

The output value derivation step may further include defining the following equation by combining Equations 4-1, 4-2, and 4-3.

$$\begin{bmatrix} h_1c_1^{a1} & -h_1s_1^{a1} & h_2c_2^{a1} & -h_2s_2^{a1} & h_3s_3^{a2} & h_3c_3^{a2} & h_4s_4^{a2} & h_4c_4^{a2} & -r_1 & r_2 & 0 & 0 \\ h_1s_1^{a1} & h_1c_1^{a1} & h_2s_2^{a1} & h_2c_2^{a1} & h_3c_3^{a2} & -h_3s_3^{a2} & h_4c_4^{a2} & -h_4s_4^{a2} & 0 & 0 & -r_3 & r_4 \\ 0 & 0 & 0 & 0 & 0 & 0 & 0 & 0 & 1 & 1 & 1 & 1 \end{bmatrix} \begin{bmatrix} F_{d1} \\ F_{s1} \\ F_{d2} \\ F_{s2} \\ F_{d3} \\ F_{s3} \\ F_{d4} \\ F_{s4} \\ F_{z1} \\ F_{z2} \\ F_{z3} \\ F_{z4} \end{bmatrix} = \begin{bmatrix} k(\Delta\theta_2 - \Delta\theta_1) \\ k(\Delta\theta_4 - \Delta\theta_3) \\ \text{mg} \end{bmatrix}$$

(hereinafter, 'Equation 5').

The output value derivation step may include defining the following equation by combining Equations 1 and 5, $$\begin{bmatrix} A_{H1} & A_{H2} & A_{H3} & A_{H4} & 0 & 0 \\ A_{V1} & A_{V2} & A_{V3} & A_{V4} & A_{V5} & A_{V6} \end{bmatrix}[F] = \begin{bmatrix} M_b a_x \\ M_b a_y \\ I_{zz}\alpha \\ k(\Delta\theta_2 - \Delta\theta_1) \\ k(\Delta\theta_4 - \Delta\theta_3) \\ mg \end{bmatrix}$$

(hereinafter, 'Equation 6'), (In Equation 6, $$[A_{V1}] = \begin{bmatrix} h_1 c_1^{a1} & -h_1 s_1^{a1} \\ h_1 s_1^{a1} & h_1 c_1^{a1} \\ 0 & 0 \end{bmatrix}, [A_{V2}] = \begin{bmatrix} h_2 c_2^{a1} & -h_2 s_2^{a1} \\ h_2 s_2^{a1} & h_2 c_2^{a1} \\ 0 & 0 \end{bmatrix},$$

$$[A_{V3}] = \begin{bmatrix} h_3 s_3^{a2} & h_3 c_3^{a2} \\ h_3 c_3^{a2} & -h_3 s_3^{a2} \\ 0 & 0 \end{bmatrix}, [A_{V4}] = \begin{bmatrix} h_4 s_4^{a2} & h_4 c_4^{a2} \\ h_4 c_4^{a2} & -h_4 s_4^{a2} \\ 0 & 0 \end{bmatrix}),$$

$$[A_{V5}] = \begin{bmatrix} -r_1 & r_2 \\ 0 & 0 \\ 1 & 1 \end{bmatrix}, [A_{V6}] = \begin{bmatrix} 0 & 0 \\ -r_3 & r_4 \\ 1 & 1 \end{bmatrix},$$

and m represents mass of the body of the mobile robot).

The output value derivation step may include deriving min $F^T Q_F F$ within a range in which Equation 6 is satisfied, (here, min represents a minimum value, $Q_F$ represents a diagonal matrix, and $[F]^\tau=[F_{d1}\ F_{s1} \ldots F_{d4}\ F_{s4}\ F_{z1}\ F_{z2}\ F_{z3}\ F_{z4}]$).

The output value derivation step may further include deriving min $F^T Q_F F$ within a range in which Equation 6 and the following condition i), condition ii), and condition iii) are satisfied, i) Condition: $-F_{dmax} < F_{di} < F_{dmax}$, ii) Condition: $-F_{smax} < F_{si} < F_{smax}$, iii) Condition: $F_{zmax} < F_{zi} < F_{zmax}$, (here, $F_{dmax}$ represents maximum rotational driving power for the wheel generated by the drive motor, $F_{smax}$ represents maximum steering driving power for the wheel generated by the steering motor, and $F_{zmin}$ and $F_{zmax}$ are preset values).

The spring property modeling step may include: a rotation-displacement relationship derivation step of deriving a relationship between an electric current value of the drive motor and a displacement amount of the spring member; and a steering-displacement relationship derivation step of deriving a relationship between a steering angle of the steering motor and the displacement amount of the spring member.

The wheels may include: a first wheel and a second wheel provided to face each other with the body interposed therebetween; and a third wheel and a fourth wheel provided to face each other with the body interposed therebetween, and the rotation-displacement relationship derivation step may include: aligning the first to fourth wheels; and deriving a first equilibrium value by deriving a deformation amount of the spring member in a state in which the drive motor operates the first to fourth wheels so that the body is in a stationary state.

The deriving of the first equilibrium value may include deriving a first-first equilibrium value by operating the first to fourth wheels by the drive motor so that the body is in the stationary state, deriving the deformation amounts of the spring members with respect to the first to fourth wheels, and then deriving the first-first equilibrium value that is an arithmetic mean of the deformation amounts of the spring members.

In the deriving of the first-first equilibrium value, the first-first equilibrium value may be derived by operating the first to fourth wheels by the drive motor so that the body is in the stationary state, deriving the deformation amounts of the spring members during process i) in which the electric current value of the drive motor varies until the electric current value becomes 0 from A % (here, A is a positive number) with respect to the first to fourth wheels, deriving the deformation amount of the spring member during process ii) in which the electric current value of the drive motor varies until the electric current value becomes 0 from −A %, and then calculating an arithmetic mean of the deformation amounts of the spring members derived during process i) and the deformation amounts of the spring members derived during process ii).

The deriving of the first equilibrium value may further include deriving a first-second equilibrium value by deriving the deformation amount of the spring member under a condition different from a condition of the deriving of the first-first equilibrium value in the state in which the drive motor operates the first to fourth wheels so that the body is in the stationary state.

In the deriving of the first-second equilibrium value, the first-second equilibrium value may be derived by operating the first to fourth wheels by the drive motor so that the body is in the stationary state, deriving the deformation amounts of the spring members with respect to the first to fourth wheels, and then deriving the first-second equilibrium value that is an arithmetic mean of the deformation amounts of the spring members.

In the deriving of the first-second equilibrium value, the first-second equilibrium value may be derived by operating the first to fourth wheels by the drive motor so that the body is in the stationary state, deriving the deformation amounts of the spring members when the electric current value of the drive motor is 0 during process i) in which the electric current value of the drive motor varies until the electric current value becomes −B % from B % (B is a positive number) with respect to the first to fourth wheels, deriving the deformation amounts of the spring members when the electric current value of the drive motor is 0 during process ii) in which the electric current value of the drive motor varies until the electric current value becomes B % from −B %, and then calculating an arithmetic mean of the deformation amounts of the spring members derived during process i) and the deformation amounts of the spring members derived during process ii), and B may be larger than A.

The deriving of the first equilibrium value may further include setting the first equilibrium value by setting an arithmetic mean of the first-first equilibrium value and the first-second equilibrium value to the first equilibrium value when a ratio between the first-first equilibrium value derived by the deriving of the first-first equilibrium value and the first-second equilibrium value derived by the deriving of the first-second equilibrium value is within a predetermined range.

The rotation-displacement relationship derivation step may include: aligning the first to fourth wheels; and deriving a second equilibrium value by deriving the deformation amount of the spring member in the state in which the drive motor operates the first to fourth wheels so that the body performs a rotational motion in place at a constant speed.

The deriving of the second equilibrium value may further include, in the state in which the body performs the rotational motion in place at the constant speed: i) deriving a first-first value, which is the deformation amount of the spring member, while the wheel is steered by $\pi_1$ ($\pi_1$ is a positive number) and then steered by $-\pi_1$; and ii) deriving a first-second value, which is the deformation amount of the spring member, while the wheel is steered by $-\pi_1$ and then steered by $\pi_1$.

The deriving of the second equilibrium value may further include, when a ratio between the first-first value and the first-second value is within a predetermined range: i) deriving a second-first value, which is the deformation amount of the spring member, when the wheel is steered by $\pi_2$ ($\pi_2$ is a positive number); ii) deriving a second-second value, which is the deformation amount of the spring member, when the wheel is steered by $2\pi_2$; and iii) determining whether a ratio between a difference between the second-second value and the second-first value and the second-first value is within a predetermined range.

The method may further include, when a ratio between a difference between a second-(n+1)th value and a second-n-th value and the second-n-th value is within a predetermined range: i) deriving a second-(n+2)th value, which is the deformation amount of the spring member, when the wheel is steered by $(n+2)\pi_2$; and ii) determining whether a ratio between a difference between the second-(n+2)th value and the second-(n+1)th value and the second-(n+1)th value is within a predetermined range (here, n is a natural number equal to or larger than 2).

The deriving of the second equilibrium value may further include, when a ratio between the first-first value and the first-second value is within a predetermined range: i) deriving a third-first value, which is the deformation amount of the spring member, when the wheel is steered by $-\pi_2$ ($\pi_2$ is a positive number); ii) deriving a third-second value, which is the deformation amount of the spring member, when the wheel is steered by $-2\pi_2$; and iii) determining whether a ratio between a difference between the third-second value and the third-first value and the third-first value is within a predetermined range.

The method may further include, when a ratio between a difference between a third-(n+1)th value and a third-n-th value and the third-n-th value is within a predetermined range: i) deriving a third-(n+2)th value, which is the deformation amount of the spring member, when the wheel is steered by $-(n+2)\pi_2$; and ii) determining whether a ratio between a difference between the third-(n+2)th value and the third-(n+1)th value and the third-(n+1)th value is within a predetermined range (here, n is a natural number equal to or larger than 2).

To achieve the above-mentioned advantages, an embodiment of the present disclosure can provide a mobile robot including: a body; a plurality of wheels provided at one side of the body; link members and spring members configured to connect the body and the wheels; a drive motor configured to provide rotational driving power for rotating the wheels; and a steering motor configured to provide steering driving power for steering the wheels, in which the spring member is configured to be elastically deformed by a change in position of the link member relative to the body, and in which the link members include a first link member and a second link member each having one side rotatably connected to the body, and the other side rotatably connected to the wheel.

The spring member may be provided in a region of the first link member that is rotatably connected to the body.

The first link member and the second link member may be provided in parallel with each other.

According to an embodiment of the present disclosure, it can be possible to maintain the body of the mobile robot in parallel with the ground surface regardless of a shape of the ground surface during a process in which the mobile robot mounted with the wheel and the elastic body, such as the spring, travels.

DETAILED DESCRIPTION OF ILLUSTRATIVE EMBODIMENTS

Hereinafter, a mobile robot and a method of controlling the same according to example embodiments of the present disclosure will be described with reference to the drawings.

Mobile Robot and Method of Controlling the Same

Figure 1:
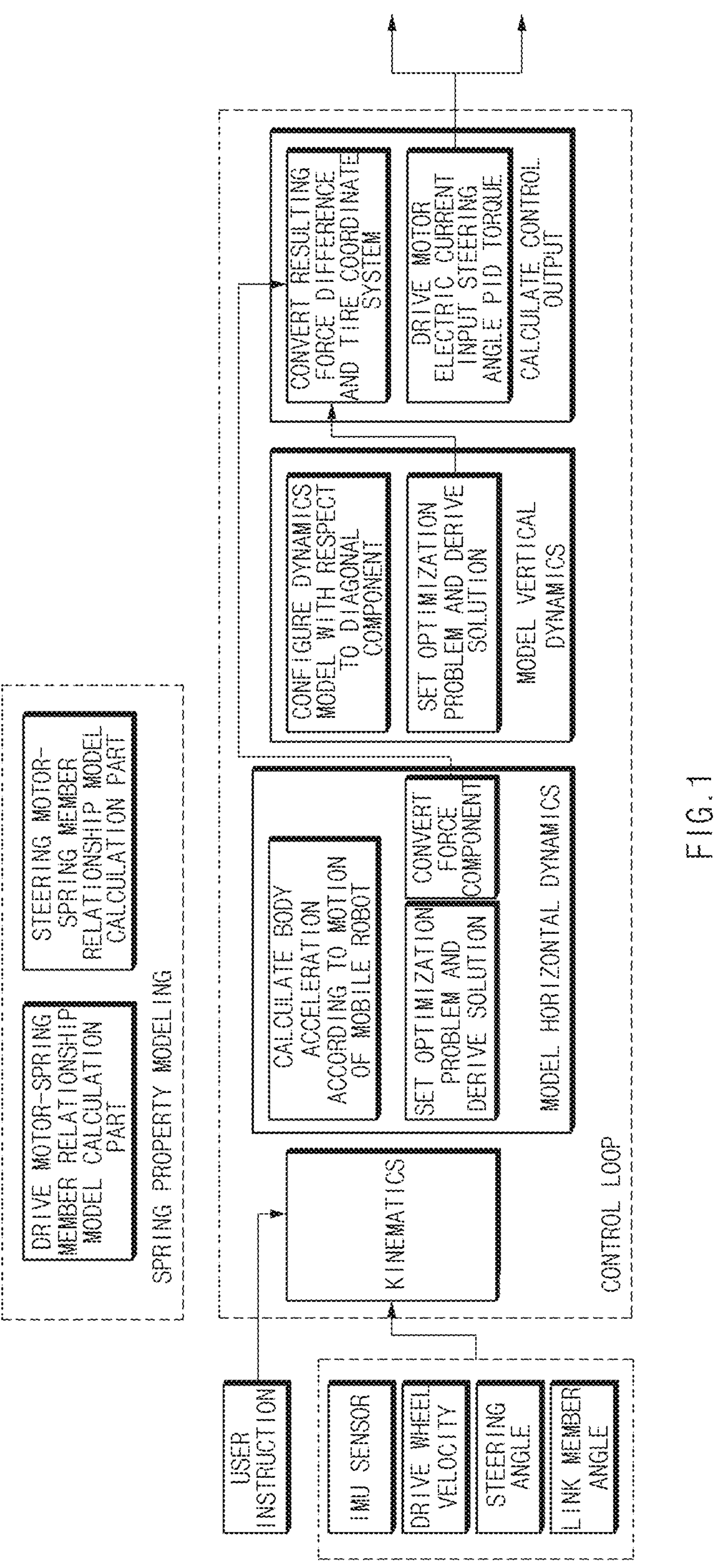
FIG. 1 is a block diagram illustrating overall steps for implementing a method of controlling a mobile robot according to an embodiment of the present disclosure.
Figure 2:
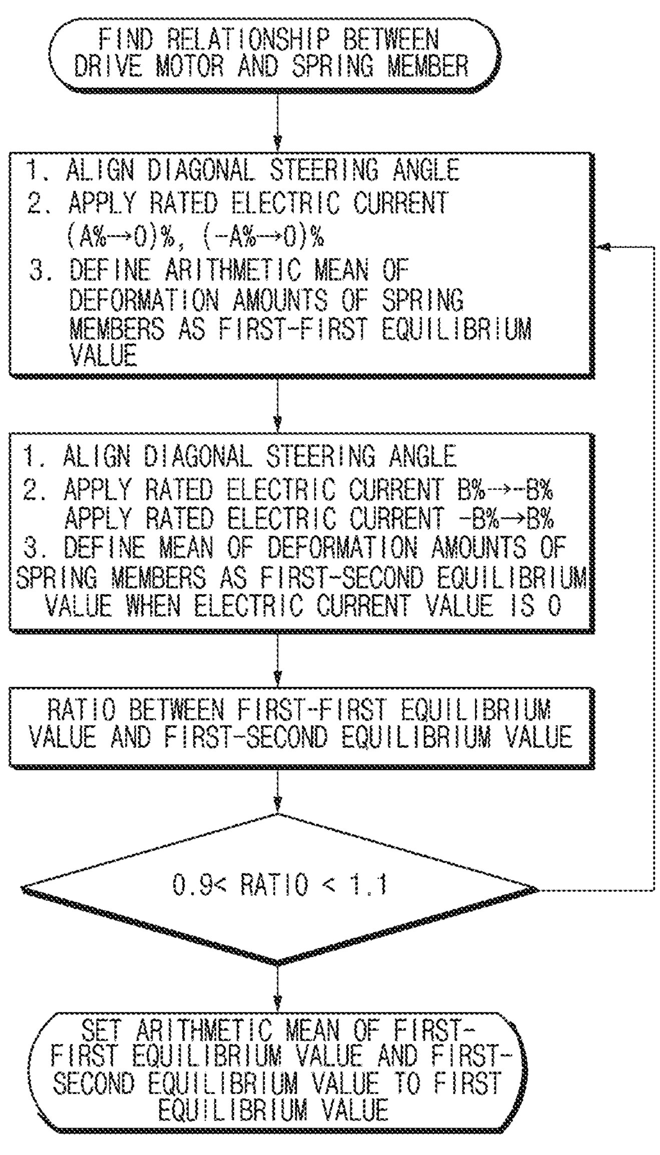
FIG. 2 is a flowchart illustrating a rotation-displacement relationship derivation step of the method of controlling the mobile robot according to an embodiment of the present disclosure.
Figure 3:
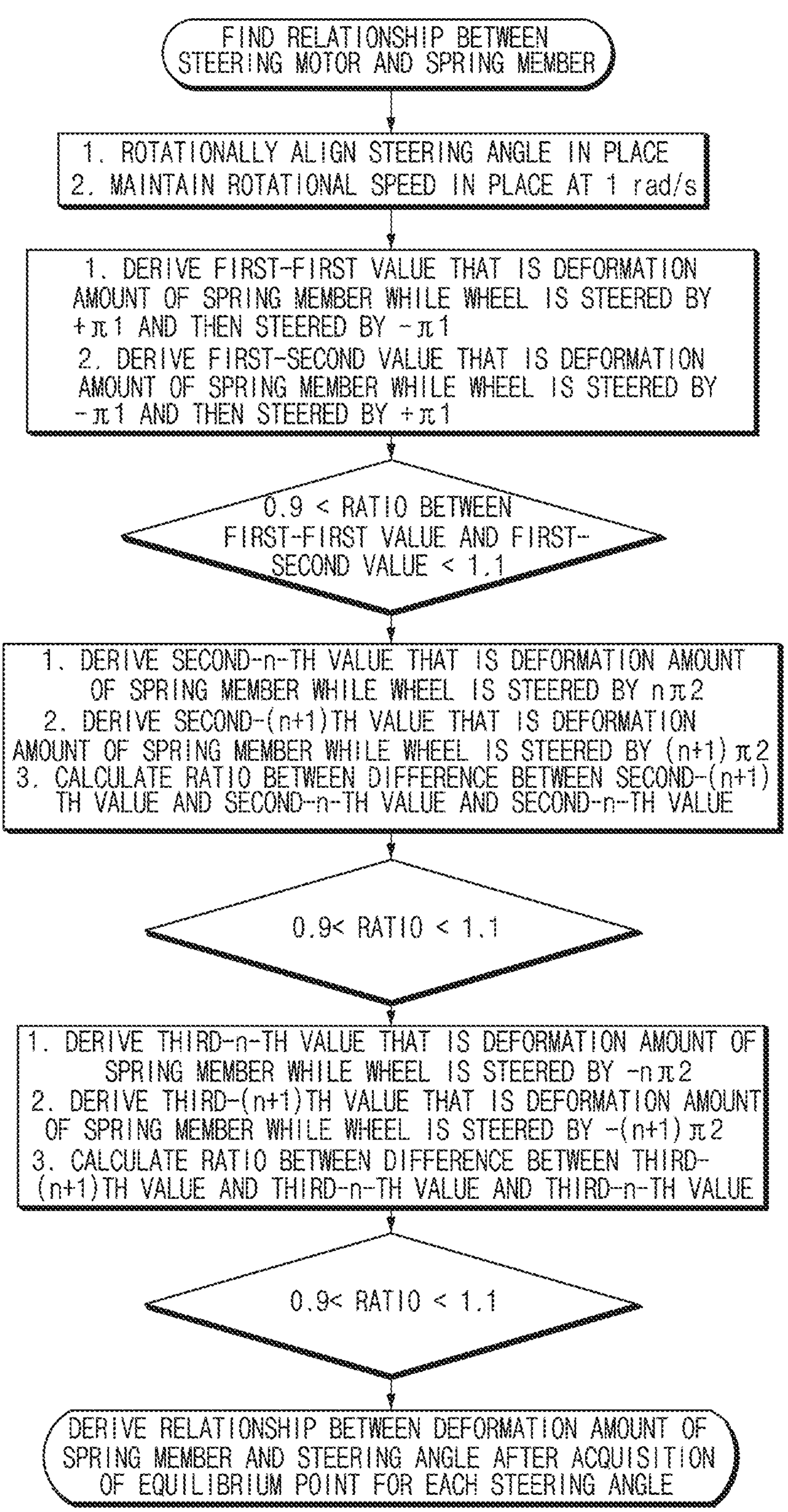
FIG. 3 is a flowchart illustrating a steering-displacement relationship derivation step of the method of controlling the mobile robot according to an embodiment of the present disclosure.
Figure 4:
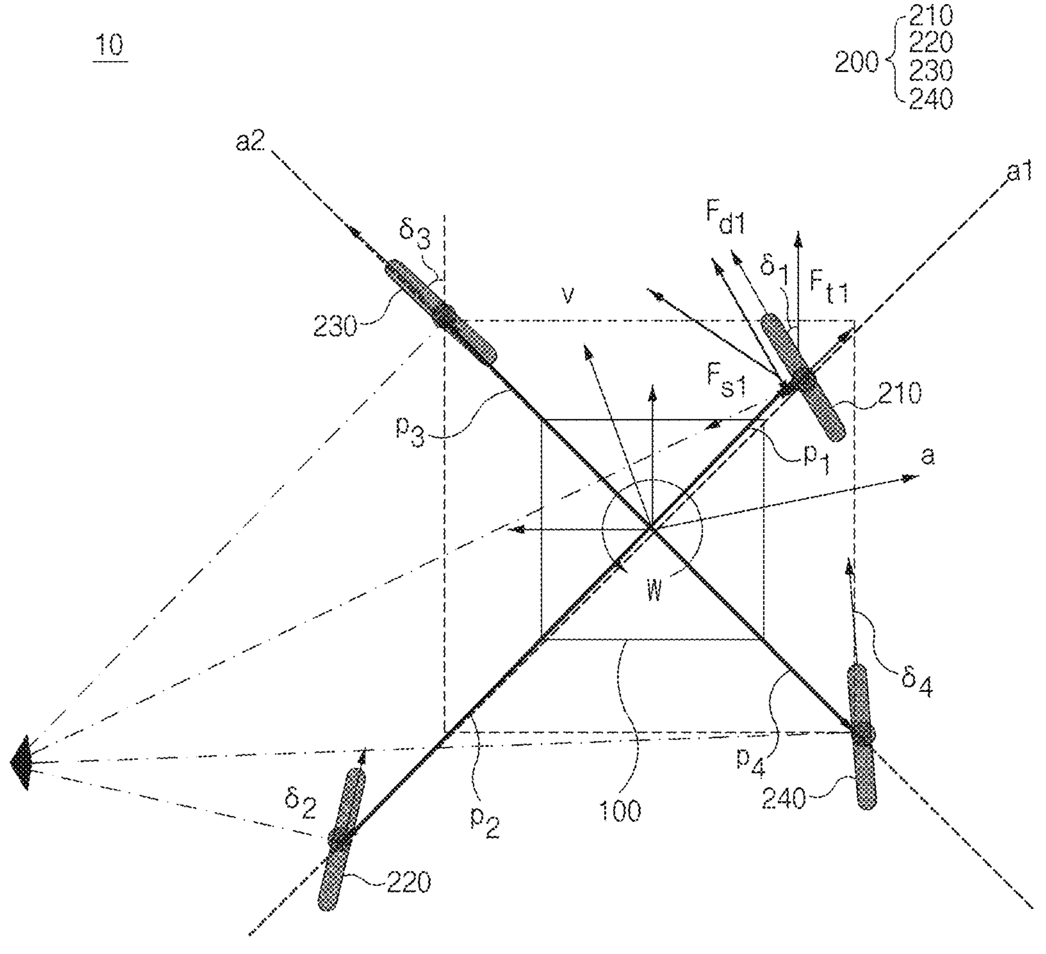
FIG. 4 is a view illustrating horizontal force components applied to the mobile robot, i.e., a view for explaining Equation 1, according to an embodiment of the present disclosure.
Figure 5:
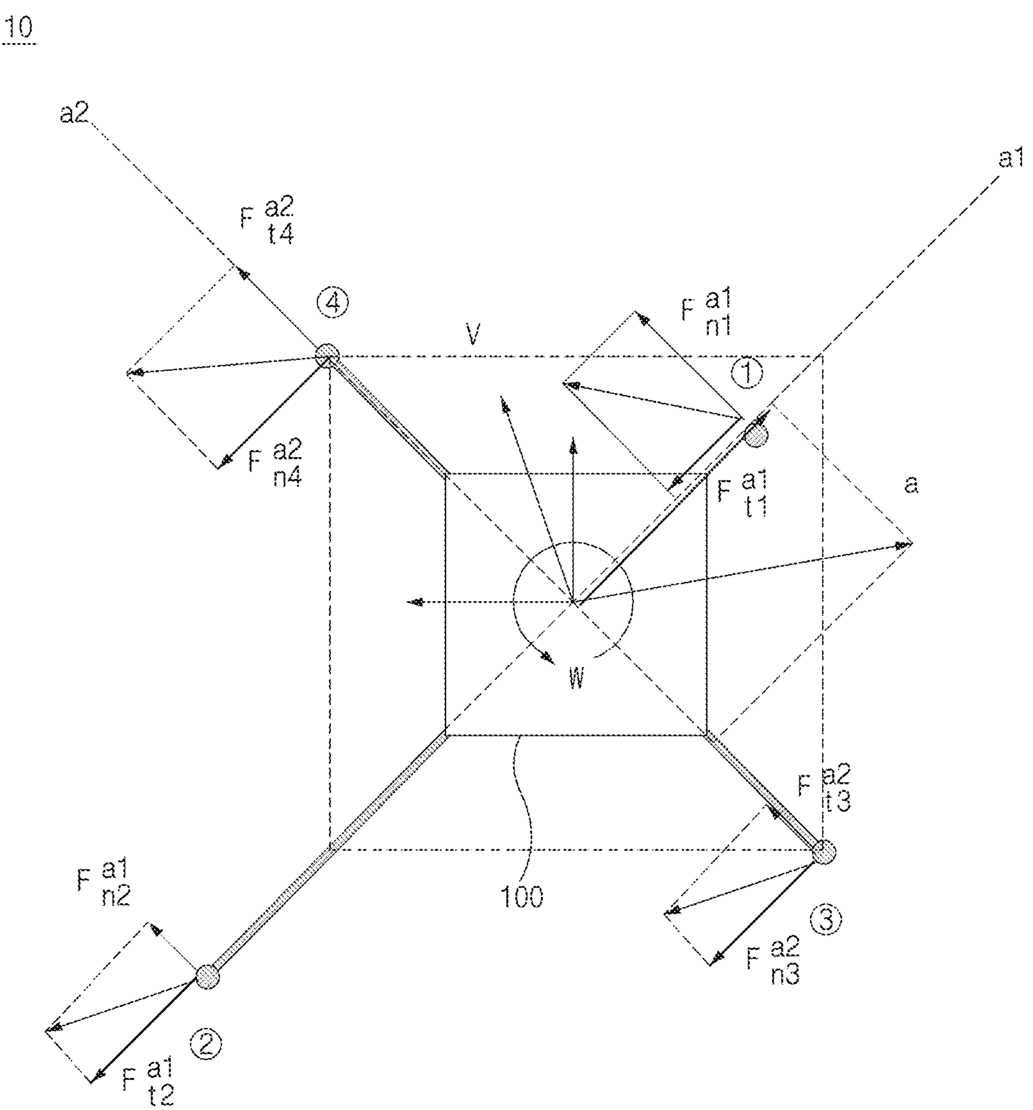
FIG. 5 is a view illustrating horizontal force components applied to the mobile robot, i.e., a view for explaining Equation 2-1, Equation 2-2, Equation 2-3, and Equation 2-4, according to an embodiment of the present disclosure.
Figure 6:
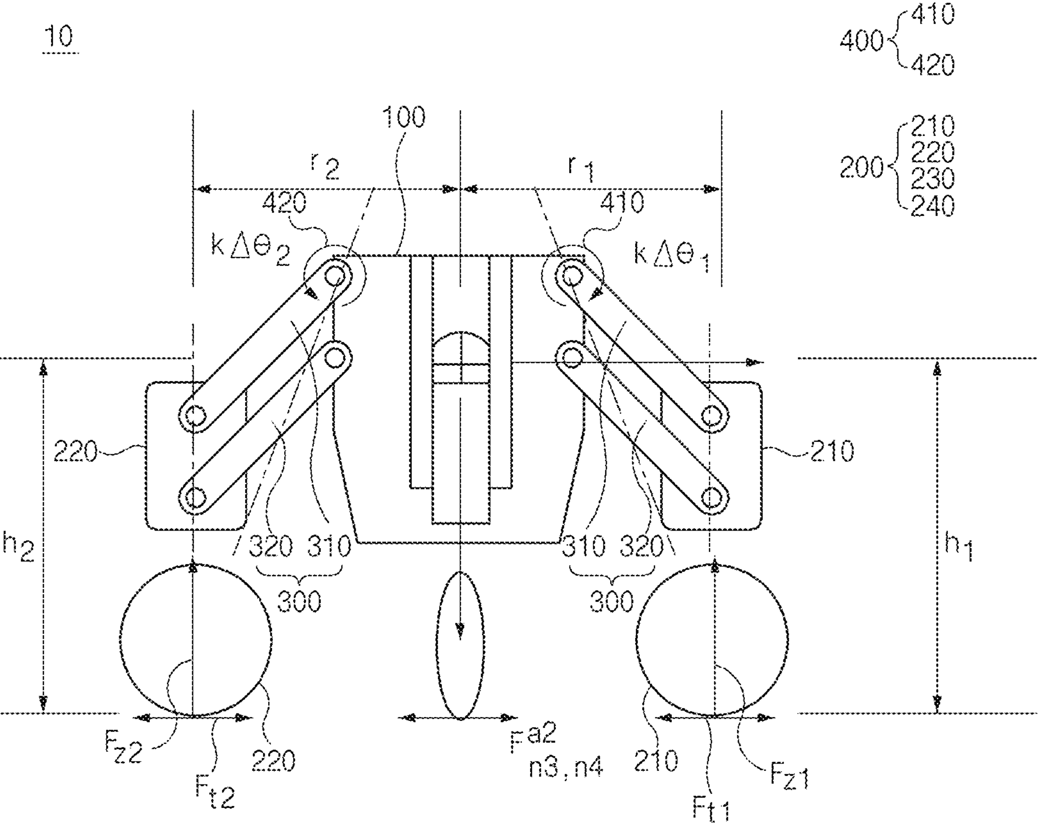
FIG. 6 is a view illustrating force components applied to the mobile robot when viewed from a location spaced apart from the mobile robot according to an embodiment of the present disclosure in direction a2.
Figure 7:
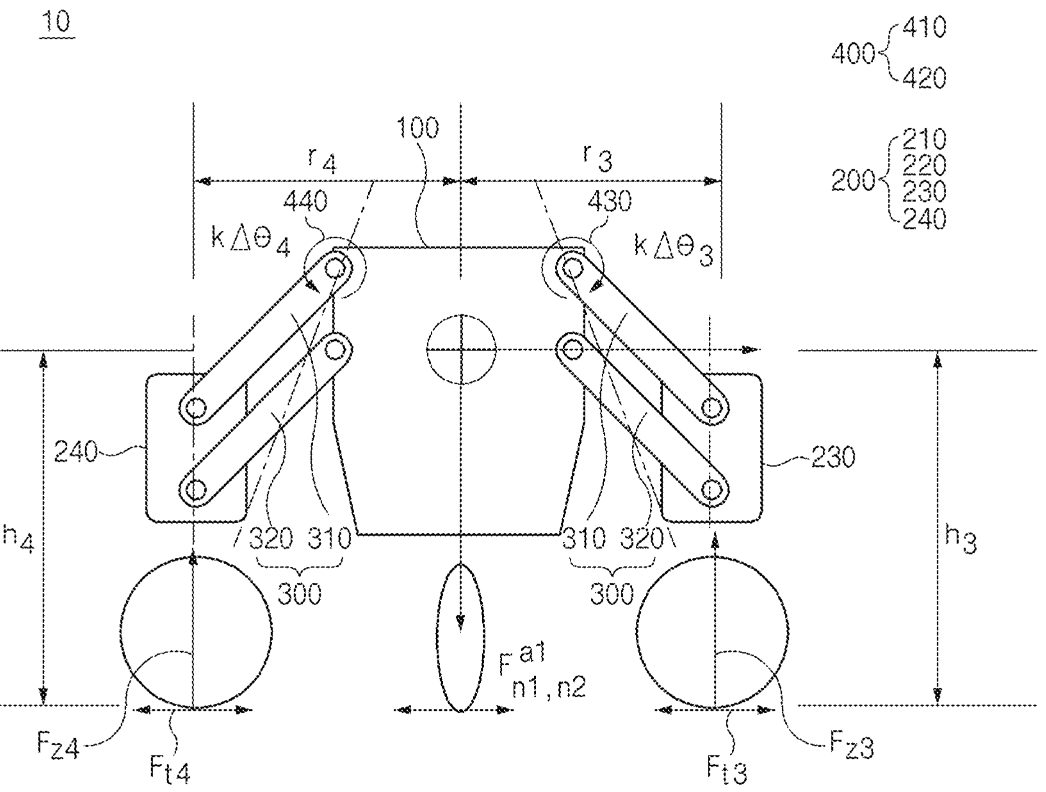
FIG. 7 is a view illustrating force components applied to the mobile robot when viewed from a location spaced apart from the mobile robot according to an embodiment of the present disclosure in direction a1.

FIG. 1 is a block diagram illustrating overall steps for implementing a method of controlling a mobile robot according to an embodiment of the present disclosure. FIG. 2 is a flowchart illustrating a rotation-displacement relationship derivation step of the method of controlling the mobile robot according to an embodiment of the present disclosure. FIG. 3 is a flowchart illustrating a steering-displacement relationship derivation step of the method of controlling the mobile robot according to an embodiment of the present disclosure. FIG. 4 is a view illustrating horizontal force components applied to the mobile robot, i.e., a view for explaining Equation 1, according to an embodiment of the present disclosure. FIG. 5 is a view illustrating horizontal force components applied to the mobile robot, i.e., a view for explaining Equation 2-1, Equation 2-2, Equation 2-3, and Equation 2-4, according to an embodiment of the present disclosure. FIG. 6 is a view illustrating force components applied to the mobile robot when viewed from a location spaced apart from the mobile robot according to an embodiment of the present disclosure in direction a2. FIG. 7 is a view illustrating force components applied to the mobile robot when viewed from a location spaced apart from the mobile robot according to an embodiment of the present disclosure in direction a1.

A mobile robot 10 according to an embodiment of the present disclosure may include a body 100, a plurality of wheels 200 provided at one side of the body 100, link members 300 and spring members 400 configured to connect the body 100 and the wheels 200, a drive motor configured to provide rotational driving power for rotating the wheels 200, and a steering motor configured to provide steering driving power for steering the wheels 200. The spring member 400 may be configured to be elastically deformed by a relative position between the body 100 and the link member 300. More specifically, the link member 300 may be rotatably connected to the body 100, and the spring member 400 may be provided in a region in which the link member 300 is connected to the body 100.

The link members 300 according to an embodiment of the present disclosure may include a first link member 310 and a second link member 320 each having one side rotatably coupled to the body 100, and the other side rotatably coupled to the wheel 200. The spring member 400 may be coupled to one side of the first link member 310. For example, the spring member 400 may be provided in a region of the first link member 310 that is rotatably connected to the body 100. The spring member 400 may be a torsion spring, but the type of spring member is not limited thereto. According to an embodiment of the present disclosure, in case that the relative position between the link member 300 and the body 100 varies when the link member 300 performs a rotational motion relative to the body 100 during a process in which the mobile robot 10 travels, the above-mentioned spring member is elastically deformed, such that the change in relative position between the link member 300 and the body 100 may be appropriately controlled. In particular, the spring member 400 may be elastically deformed by weights the mobile robot 10 and persons or items transported by the mobile robot 10, and the elastic deformation of the spring member 400 may also occur during a process in which the mobile robot 10 is accelerated, decelerated, or steered. For example, the first link member 310 and the second link member 320 may be provided in parallel with each other.

The method of controlling the mobile robot according to an embodiment of the present disclosure may include a spring property modeling step of deriving a relationship between an electric current value of the drive motor corresponding to each of the wheel 200 and a displacement amount of the spring member 400 corresponding to each of the wheels 200, and a relationship between a rotation angle of the steering motor and the displacement amount of the spring member 400. The displacement amount of the spring member 400 may be a degree (e.g., a deformation angle) to which the spring member 400 is elastically deformed in comparison with a state of the spring member 400 when the mobile robot 10 is in a stationary state. The spring property modeling step according to an embodiment of the present disclosure can be provided to calculate and derive an output value of the drive motor and an output value of the steering motor when a predetermined instruction is provided to the mobile robot 10 during the process in which the mobile robot 10 travels.

The method of controlling the mobile robot according to an embodiment of the present disclosure may further include an output value derivation step of deriving an output value of the drive motor and an output value of the steering motor on the basis of the relationship derived in the spring property modeling step when an instruction related to a movement of the mobile robot 10 is provided. The instruction related to the movement of the mobile robot 10 may include a required velocity, a required acceleration, and a turning angle of the mobile robot 10. The method of controlling the mobile robot may further include a driving step of controlling the drive motor and the steering motor on the basis of the output value derived in the output value derivation step. Next, the above-mentioned output value derivation step will be described in detail.

According to an embodiment of the present disclosure, the output value derivation step may include calculating an equation of a horizontal force or an equation of a moment of force of the mobile robot 10 in response to the instruction related to the velocity, the acceleration, and the turning angle provided to the mobile robot 10. More particularly, the output value derivation step may include calculating both the equation of the horizontal force and the equation of the moment of force of the mobile robot 10.

For example, with reference to FIG. 4 and the like, when an operation direction of the wheel 200 is defined as direction d among horizontal directions of the mobile robot 10 and a direction perpendicular to direction d among the horizontal directions of the mobile robot 10 is defined as direction s, the equation of the horizontal force and the equation of the moment of force calculated in the above-mentioned output value derivation step may be defined as follows.

$$[A_{H1} \quad A_{H2} \quad A_{H3} \quad A_{H4}][F_H]^T = \begin{bmatrix} M_b a_x \\ M_b a_y \\ I_{zz}\alpha \end{bmatrix}$$

(hereinafter, 'Equation 1').

$$\text{(Here, } A_{H1} = \begin{bmatrix} c_i & -s_i \\ s_i & c_i \\ p_{iy}c_i + p_{ix}s_i & -p_{iy}s_i + p_{ix}c_i \end{bmatrix},$$

$$[F_H] = [F_{d1} \quad F_{s1} \quad \ldots \quad F_{d4} \quad F_{s4}],$$

$$c_i = \cos(\delta_i),$$

$$s_i = \sin(\delta_i),$$

$M_b$ represents mass of the mobile robot, $a_x$ represents an acceleration in direction x among the horizontal directions of the mobile robot, $a_y$ represents an acceleration in direction y perpendicular to direction x among the horizontal directions of the mobile robot, $p_i$ represents a distance from a center of the mobile robot toward each of the wheels, $I_{zz}$ represents a moment of inertia based on a z-axis extending from the center of the mobile robot and extending in direction z perpendicular to direction x and direction y, $\alpha$ represents a rotational angular acceleration of the mobile robot based on the z-axis, $\delta_i$ represents a steering angle of the wheel, $F_d$ represents rotational driving power for the wheel generated by the drive motor, $F_s$ represents steering driving power for the wheel generated by the steering motor, and numbers of subscripts represent the wheels provided in the mobile robot).

That is, for example, $F_{d1}$ may represent rotational driving power for a first wheel 210, and $F_{s1}$ may represent steering driving power for the first wheel 210.

The output value derivation step may include calculating an equation of a vertical force or an equation of a moment of force of the mobile robot 10 in response to the instruction related to the velocity, the acceleration, and the turning angle provided to the mobile robot 10. More particularly, the output value derivation step may include calculating both the equation of the vertical force and the equation of the moment of force of the mobile robot 10.

For example, with reference to FIGS. 5 and 6 and the like, the wheels 200 of the mobile robot 10 according to an embodiment of the present disclosure may include the first wheel 210 and a second wheel 220 provided to face each other with the body 100 of the mobile robot 10 interposed therebetween, and a third wheel 230 and a fourth wheel 240 provided to face each other with the body 100 of the mobile robot 10 interposed therebetween. When a direction in which the first wheel 210 and the second wheel 220 face each other is defined as direction a1 and a direction in which the third wheel 230 and the fourth wheel 240 face each other is defined as direction a2, the equation of the vertical force and the equation of the moment of force calculated in the above-mentioned output value derivation step may be defined as follows.

$$-F_{z1}r_1+F_{z2}r_2+F_{t1}^{a1}h_1+F_{t2}^{a1}h_{2+}+F_{n3}^{a2}h_3+F_{n4}^{a2}h_4=M_{a1}$$

(hereinafter, 'Equation 2-1').

(In Equation 2-1, $F_z$ represents a force applied to the wheel in the vertical direction by the ground surface, $F_t^{a1}$ represents a force applied to the first wheel or the second wheel in direction a1 by the ground surface, $F_n^{a2}$ represents a force applied to the third wheel or the fourth wheel in direction a1 by the ground surface, r represents a horizontal distance between a portion of the wheel, which is in contact with the ground surface and the center of the mobile robot, h represents a vertical distance between the portion of the wheel, which is in contact with the ground surface, and the center of the mobile robot, $M_{a1}$ represents a moment of force applied to the mobile robot in direction a1).

Equation 2-1 may be considered as the equation of the moment of force of the mobile robot 10 in direction a1. According to an embodiment of the present disclosure, the following equation may be set to be satisfied in the output value derivation step so that the mobile robot 10 is maintained to be parallel to direction a1 during the process in which the mobile robot 10 travels.

$$k(\Delta\theta_2-\Delta\theta_1)=M_{a1}$$

(hereinafter, 'Equation 2-2').

(In Equation 2-2, k represents an elastic modulus of the spring member, and Δθ represents the displacement amount of the spring member).

The spring members 400 may include a first spring member 410 provided at a side of the first link member 310 connected to the first wheel 210, a second spring member 420 provided at a side of the first link member 310 connected to the second wheel 220, a third spring member 430 provided at a side of the first link member 310 connected to the third wheel 230, and a fourth spring member 440 provided at a side of the first link member 310 connected to the fourth wheel 240. The above-mentioned description of the spring member 400 may be equally applied to the first to fourth spring members 410, 420, 430, and 440.

With reference to FIGS. 5 and 7 and the like, according to an embodiment of the present disclosure, the equation of the vertical force and the equation of the moment of force calculated in the output value derivation step may be additionally defined as follows.

$$-F_{z3}r_3+F_{z4}r_4+F_{t3}^{a2}h_3+F_{t4}^{a2}h_4+F_{n1}^{a1}h_1+F_{n2}^{a1}h_2=M_{a2}$$

(hereinafter, 'Equation 2-3').

(In Equation 2-3, $F_t^{a2}$ represents a force applied to the first wheel or the second wheel in direction a1 by the ground surface, $F_n^{a1}$ represents a force applied to the third wheel or the fourth wheel in direction a1 by the ground surface, and $M_{a2}$ represents a moment of force applied to the mobile robot in direction a2).

Equation 2-3 may be considered as the equation of the moment of force of the mobile robot 10 in direction a2. According to an embodiment of the present disclosure, the following equation may be set to be additionally satisfied in the output value derivation step so that the mobile robot 10 is maintained to be parallel to direction a2 during the process in which the mobile robot 10 travels.

$$k(\Delta\theta_4-\Delta\theta_3)=M_{a2}$$

(hereinafter, 'Equation 2-4').

With continued reference to the drawings, the output value derivation step of the method of controlling the mobile robot according to an embodiment of the present disclosure may further include rotationally converting values of $F_t^{a1}$, $F_t^{a2}$, $F_n^{a2}$, and $F_n^{a1}$, which are derived by the above-mentioned equations, into $F_d$ and $F_s$.

More specifically, according to an embodiment of the present disclosure, the first wheel, the second wheel 220, the third wheel 230, and the fourth wheel 240 may be respectively provided in regions that are rotationally symmetrical at 45 degrees with respect to the center of the mobile robot 10. The output value derivation step may further include rotationally converting values of $F_t^{a1}$, $F_t^{a2}$, $F_n^{a2}$, and $F_n^{a1}$ into $F_d$ and $F_s$ by use of the following equations.

$$\begin{bmatrix}F_{ti}^{a1}\\F_{ni}^{a1}\end{bmatrix}=\begin{bmatrix}\cos(\delta_i+\pi/4) & -\sin(\delta_i+\pi/4)\\ \sin(\delta_i+\pi/4) & \cos(\delta_i+\pi/4)\end{bmatrix}\begin{bmatrix}F_{di}\\F_{si}\end{bmatrix}=\begin{bmatrix}c_i^{a1} & -s_i^{a1}\\ s_i^{a1} & c_i^{a1}\end{bmatrix}\begin{bmatrix}F_{di}\\F_{si}\end{bmatrix}$$

(hereinafter, 'Equation 3-1') when $i$ is 1 or 2.

$$\begin{bmatrix}F_{ti}^{a2}\\F_{ni}^{a2}\end{bmatrix}=\begin{bmatrix}\cos(\delta_i+\pi/4) & -\sin(\delta_i+\pi/4)\\ \sin(\delta_i+\pi/4) & \cos(\delta_i+\pi/4)\end{bmatrix}\begin{bmatrix}F_{di}\\F_{si}\end{bmatrix}=\begin{bmatrix}c_i^{a2} & -s_i^{a2}\\ s_i^{a2} & c_i^{a2}\end{bmatrix}\begin{bmatrix}F_{di}\\F_{si}\end{bmatrix}$$

(hereinafter, 'Equation 3-2') when $i$ is 3 or 4.

According to an embodiment of the present disclosure, the output value derivation step may further include defining the following equations by applying Equations 2-2, 2-4, 3-1, and 3-2 to Equations 2-1 and 2-3 described above.

$$-F_{z1}r_1+F_{z2}r_2+(c_1^{a1}F_{d1}-s_1^{a1}F_{s1})h_1+(c_2^{a1}F_{d2}-s_2^{a1}F_{s2})h_2+(s_3^{a2}F_{d3}+c_3^{a2}F_{s3})h_3+(s_4^{a2}F_{d4}+c_4^{a2}F_{s4})h_4=k(\Delta\theta_2-\Delta\theta_1)$$

(hereinafter, 'Equation 4-1').

$$-F_{z3}r_3+F_{z4}r_4+(s_1^{a1}F_{d1}+c_1^{a1}F_{s1})h_1+(s_2^{a1}F_{d2}+c_2^{a1}F_{s2})h_2+(c_3^{a2}F_{d3}-s_3^{a2}F_{s3})h_3+(c_4^{a2}F_{d4}-s_4^{a2}F_{s4})h_4=k(\Delta\theta_4-\Delta\theta_3)$$

(hereinafter, 'Equation 4-2').

$$F_{z1}+F_{z2}+F_{z3}+F_{z4}=mg$$

(hereinafter, 'Equation 4-3').

According to an embodiment of the present disclosure, the output value derivation step may further include defining the flowing equation by combining Equations 4-1, 4-2, and 4-3.

$$\begin{bmatrix} h_1c_1^{a1} & -h_1s_1^{a1} & h_2c_2^{a1} & -h_2s_2^{a1} & h_3s_3^{a2} & h_3c_3^{a2} & h_4s_4^{a2} & h_4c_4^{a2} & -r_1 & r_2 & 0 & 0 \\ h_1s_1^{a1} & h_1c_1^{a1} & h_2s_2^{a1} & h_2c_2^{a1} & h_3c_3^{a2} & -h_3s_3^{a2} & h_4c_4^{a2} & h_4s_4^{a2} & 0 & 0 & -r_3 & r_4 \\ 0 & 0 & 0 & 0 & 0 & 0 & 0 & 0 & 1 & 1 & 1 & 1 \end{bmatrix} \begin{bmatrix} F_{d1} \\ F_{s1} \\ F_{d2} \\ F_{s2} \\ F_{d3} \\ F_{s3} \\ F_{d4} \\ F_{s4} \\ F_{z1} \\ F_{z2} \\ F_{z3} \\ F_{z4} \end{bmatrix} = \begin{bmatrix} k(\Delta\theta_2-\Delta\theta_1) \\ k(\Delta\theta_4-\Delta\theta_3) \\ mg \end{bmatrix}$$

(hereinafter, 'Equation 5').

According to an embodiment of the present disclosure, the output value derivation step may further include defining the following equation by combining Equations 1 and 5.

$$\begin{bmatrix} A_{H1} & A_{H2} & A_{H3} & A_{H4} & 0 & 0 \\ A_{V1} & A_{V2} & A_{V3} & A_{V4} & A_{V5} & A_{V6} \end{bmatrix}[F] = \begin{bmatrix} M_ba_x \\ M_ba_y \\ I_{zz}\alpha \\ k(\Delta\theta_2-\Delta\theta_1) \\ k(\Delta\theta_4-\Delta\theta_3) \\ mg \end{bmatrix}$$

(hereinafter, 'Equation 6').

(In Equation 6, $$[A_{V1}] = \begin{bmatrix} h_1c_1^{a1} & -h_1s_1^{a1} \\ h_1s_1^{a1} & h_1c_1^{a1} \\ 0 & 0 \end{bmatrix}, [A_{V2}] = \begin{bmatrix} h_2c_2^{a1} & -h_2s_2^{a1} \\ h_2s_2^{a1} & h_2c_2^{a1} \\ 0 & 0 \end{bmatrix},$$

$$[A_{V3}] = \begin{bmatrix} h_3s_3^{a2} & h_3c_3^{a2} \\ h_3c_3^{a2} & -h_3s_3^{a2} \\ 0 & 0 \end{bmatrix}, [A_{V4}] = \begin{bmatrix} h_4s_4^{a2} & h_4c_4^{a2} \\ h_4c_4^{a2} & -h_4s_4^{a2} \\ 0 & 0 \end{bmatrix}\Bigg),$$

-continued $$[A_{V5}] = \begin{bmatrix} -r_1 & r_2 \\ 0 & 0 \\ 1 & 1 \end{bmatrix}, [A_{V6}] = \begin{bmatrix} 0 & 0 \\ -r_3 & r_4 \\ 1 & 1 \end{bmatrix},$$

and m represents mass of the body of the mobile robot).

According to an embodiment of the present disclosure, the output value derivation step may further include deriving min $F^T Q_F F$ within a range in which Equation 6 is satisfied.

(Here, min represents a minimum value, $Q_F$ represents a diagonal matrix, and $[F]^T=[F_{d1}\ F_{s1}\ \ldots\ F_{d4}\ F_{s4}\ F_{z1}\ F_{z2}\ F_{z3}\ F_{z4}]$).

$Q_F$ may be a value for weighting elements that constitute a matrix F, and $Q_F$ may vary depending on which values of the elements constituting the matrix F are to be weighted relatively. For example, $Q_F$ may be a unit matrix.

More specifically, the output value derivation step may further include deriving min $F^F Q_F F$ within a range in which Equation 6 and the following i) condition, ii) condition, and iii) condition are satisfied.

i) Condition: $-F_{dmax}<F_{di}<F_{dmax}$, ii) Condition: $-F_{smax}<F_{si}<F_{smax}$, iii) Condition: $F_{zmax}<F_{zi}<F_{zmax}$, (Here, $F_{dmax}$ represents maximum rotational driving power for the wheel generated by the drive motor, $F_{smax}$ represents maximum steering driving power for the wheel generated by the steering motor, and $F_{zmin}$ and $F_{zmax}$ are preset values).

The values of $F_{dmax}$ and $F_{smax}$ may be values having predetermined ratios of maximum output values of the drive motor and the steering motor. In addition, $F_{dmax}$ may mean maximum rotational driving power in one direction of the wheel, $-F_{dmax}$ may mean maximum rotational driving power in the other direction of the wheel (i.e., a direction opposite to one direction), $F_{smax}$ may mean maximum steering driving power in one direction of the wheel, and $-F_{smax}$ may mean maximum steering driving power in the other direction of the wheel (i.e., the direction opposite to one direction). $F_{zmin}$ and $F_{zmax}$ may be values preset in accordance with design.

Hereinafter, the spring property modeling step will be described below in detail.

According to an embodiment of the present disclosure, the above-mentioned spring property modeling step may include a rotation-displacement relationship derivation step of deriving a relationship between an electric current value of the drive motor and a displacement amount of the spring member 400, and a steering-displacement relationship derivation step of deriving a relationship between a steering angle of the steering motor and the displacement amount of the spring member 400.

More specifically, the wheels may include the first wheel 210 and the second wheel 220 provided to face each other with the body 100 of the mobile robot 10 interposed therebetween, and the third wheel 230 and the fourth wheel 240 provided to face each other with the body 100 of the mobile robot 10 interposed therebetween. The rotation-displacement relationship derivation step may include aligning the first to fourth wheels 210, 220, 230, and 240, and deriving a first equilibrium value by deriving a deformation amount of the spring member 400 in a state in which the drive motor operates the first to fourth wheels 210, 220, 230, and 240 so that the body 100 is in a stationary state. More specifically, in the rotation-displacement relationship derivation step, the first to fourth wheels 210, 220, 230, and 240 may be aligned to be steered diagonally outward from the body 100. Hereinafter, the deriving of the first equilibrium value will be described in detail.

With reference to FIG. 2, according to an embodiment of the present disclosure, the deriving of the first equilibrium value deriving a first-first equilibrium value by operating the first to fourth wheels 210, 220, 230, and 240 by the drive motor so that the body 100 is in the stationary state, deriving deformation amounts of the spring members 400 with respect to the first to fourth wheels 210, 220, 230, and 240, and then deriving the first-first equilibrium value that is an arithmetic mean of the deformation amounts of the spring members 400. More specifically, in the deriving of the first-first equilibrium value, the first-first equilibrium value may be derived by operating the first to fourth wheels 210, 220, 230, and 240 by the drive motor so that the body 100 is in the stationary state, deriving the deformation amounts of the spring members 400 during process i) in which the electric current value of the drive motor varies until the electric current value becomes 0 from A % (here, A is a positive number) with respect to the first to fourth wheels 210, 220, 230, and 240, deriving the deformation amounts of the spring members 400 during process ii) in which the electric current value of the drive motor varies until the electric current value becomes 0 from −A %, and calculating an arithmetic mean of the deformation amounts of the spring members 400 derived during process i) and the deformation amounts of the spring members 400 derived during process ii). For example, A may be 10.

The deriving of the first equilibrium value may further include deriving a first-second equilibrium value in addition to the deriving of the first-first equilibrium value. More specifically, the deriving of the first equilibrium value may further include the deriving of the first-second equilibrium value including deriving the deformation amounts of the spring members 400 under a condition different from a condition of the deriving of the first-first equilibrium value in the state in which the drive motor operates the first to fourth wheels 210, 220, 230, and 240 so that the body 100 is in the stationary state.

More specifically, in the deriving of the first-second equilibrium value, the first-second equilibrium value may be derived by operating the first to fourth wheels 210, 220, 230, and 240 by the drive motor so that the body 100 is in the stationary state, deriving the deformation amounts of the spring members 400 with respect to the first to fourth wheels 210, 220, 230, and 240, and then deriving the first-second equilibrium value that is an arithmetic mean of the deformation amounts of the spring members 400. For example, in the first-second equilibrium value in the deriving of the first-second equilibrium value, the deformation amounts of the spring members 400, which respectively correspond to the first to fourth wheels 210, 220, 230, and 240, may be derived by operating the first to fourth wheels 210, 220, 230, and 240 by the drive motor so that the body 100 is in the stationary state, deriving the deformation amounts of the spring members 400 when the electric current value of the drive motor is 0 during process i) in which the electric current value of the drive motor varies until the electric current value becomes-B % from B % (B is a positive number) with respect to the first to fourth wheels 210, 220, 230, and 240, deriving the deformation amounts of the spring members 400 when the electric current value of the drive motor is 0 during process ii) in which the electric current value of the drive motor varies until the electric current value becomes B % from −B %, and then calculating an arithmetic mean of the deformation amounts of the spring members 400 derived during process i) and the deformation amounts of the spring members 400 derived during process ii). In this case, B may be larger than A described above. For example, B may be 90. During process i) and process ii) of the deriving of the first-second equilibrium value, the electric current value may discontinuously increase or decrease over time (e.g., discontinuously increase by 10% or discontinuously decrease by 10%).

The deriving of the first equilibrium value may further include setting the first equilibrium value by setting an arithmetic mean of the first-first equilibrium value and the first-second equilibrium value to the first equilibrium value in case that a ratio between the first-first equilibrium value derived by the deriving of the first-first equilibrium value and the first-second equilibrium value derived by the deriving of the first-second equilibrium value is within a predetermined range. For example, in the deriving of the first equilibrium value, the first equilibrium value may be set in case that the ratio between the first-first equilibrium value and the first-second equilibrium value has a value of 0.9 or more and 1.1 or less.

Next, the rotation-displacement relationship derivation step of the method of controlling the mobile robot according to an embodiment of the present disclosure will be described in detail.

According to an embodiment of the present disclosure, the rotation-displacement relationship derivation step may include aligning the first to fourth wheels 210, 220, 230, and 240, and deriving a second equilibrium value by deriving the deformation amounts of the spring members 400 in a state in which the drive motor operates the first to fourth wheels so that the body 100 is in a state in which the body 100 performs a rotational motion in place at a constant speed.

More specifically, with reference to FIG. 3, the deriving of the second equilibrium value may further include, in the state in which the body 100 performs the rotational motion in place at the constant speed, i) deriving a first-first value, which is the deformation amount of the spring member 400, during a process in which the wheel 200 is steered by $\pi_1$ ($\pi_1$ is a positive number) and then steered by $-\pi_1$, and ii) deriving a first-second value, which is the deformation amount of the spring member 400, during a process in which the wheel 200 is steered by $-\pi_1$ and then steered by $\pi_1$. For example, x, may be 0.01 rad.

With continued reference to FIG. 3, the deriving of the second equilibrium value may further include, in case that a ratio between the first-first value and the first-second value is within a predetermined range (e.g., 0.9 or more and 1.1 or less), i) deriving a second-first value, which is the deformation amount of the spring member 400, when the wheel 200 is steered by $\pi_2$ ($\pi_2$ is a positive number), ii) deriving a second-second value, which is the deformation amount of the spring member 400, when the wheel 200 is steered by $2\pi_2$, and iii) determining whether a ratio between a difference between the second-second value and the second-first value and the second-first value is within a predetermined range (e.g., 0.9 or more and 1.1 or less). For example, $\pi_2$ may be 0.01 rad.

According to an embodiment of the present disclosure, the method may further include, in case that it is determined that the ratio between the difference between the second-second value and the second-first value and the second-first value is within the predetermined range, i) deriving a second-third value, which can be the deformation amount of the spring member 400, when the wheel 200 is steered by $3\pi_2$, and ii) determining whether a ratio between a difference between the second-third value and the second-second value and the second-second value is within a predetermined range. In particular, according to an embodiment of the present disclosure, the deformation amount of the spring member 400 can be derived when the wheel 200 is steered by $n\pi_2$, such that the above-mentioned processes may be repeated. That is, according to an embodiment of the present disclosure, the method may further include, in case that a ratio between a difference between a second-(n+1)th value and a second-n-th value and the second-n-th value can be within a predetermined range, i) deriving a second-(n+2)th value, which can be the deformation amount of the spring member 400, when the wheel 200 is steered by $(n+2)\pi_2$, and ii) determining whether the ratio between the difference between the second-(n+2)th value and the second-(n+1)th value and the second-(n+1)th value is within a predetermined range (here, n is a natural number equal to or larger than 2).

The deriving of the second equilibrium value may further include deriving the deformation amount of the spring member 400 while increasing the steering angle in a direction opposite to the steering direction of the wheel defined in the above-mentioned step. More specifically, the deriving of the second equilibrium value may further include, in case that the ratio between the first-first value and the first-second value is within a predetermined range, i) deriving a third-first value, which is the deformation amount of the spring member 400, when the wheel 200 is steered by $-\pi_2$ ($\pi_2$ is a positive number), ii) deriving a third-second value, which can be the deformation amount of the spring member 400, when the wheel 200 is steered by $-2\pi_2$, and iii) determining whether a ratio between a difference between the third-second value and the third-first value and the third-first value is within a predetermined range.

According to an embodiment of the present disclosure, the method may further include, in case that it is determined that the ratio between the difference between the third-second value and the third-first value and the third-first value is within the predetermined range, i) deriving a third-third value, which can be the deformation amount of the spring member 400, when the wheel 200 is steered by $-3\pi_2$, and ii) determining whether a ratio between a difference between the third-third value and the third-second value and the third-second value is within a predetermined range. In particular, according to an embodiment of the present disclosure, the deformation amount of the spring member 400 can be derived when the wheel 200 is steered by $-n\pi_2$, such that the above-mentioned processes may be repeated. That is, according to an embodiment of the present disclosure, the deriving of the second equilibrium value may further include, in case that a ratio between a difference between a third-(n+1)th value and a third-n-th value and the third-n-th value is within a predetermined range, i) deriving a third-(n+2)th value, which is the deformation amount of the spring member, when the wheel is steered by $-(n+2)\pi_2$, and ii) determining whether a ratio between a difference between the third-(n+2)th value and the third-(n+1)th value and the third-(n+1)th value is within a predetermined range. Therefore, according to an embodiment of the present disclosure, it can be possible to derive the relationship between the steering angle of the steering motor and the deformation amount of the spring member by use of the deriving of the second equilibrium value.

The present disclosure has been described with reference to the limited example embodiments and the drawings, but the present disclosure is not necessarily limited thereby. The present disclosure may be carried out in various forms by those skilled in the art, to which the present disclosure pertains, within the technical spirit of the present disclosure and scopes equivalent to the appended claims.

What is claimed is:

1. A method of controlling a mobile robot, the method comprising:

modeling a spring property by:

deriving a rotation-displacement relationship between an electric current value of a drive motor of the mobile robot and a displacement amount of a spring member of the mobile robot; and deriving a steering-displacement relationship between a rotation angle of a steering motor of the mobile robot and the displacement amount of the spring member, wherein:

the mobile robot comprises:

a body:

a plurality of wheels;

a plurality of link members;

a plurality of spring members including the spring member;

the drive motor configured to provide rotational driving power for rotating the plurality of wheels; and the steering motor configured to provide steering driving power for steering the plurality of wheels, the plurality of spring members and the plurality of link members are configured to connect the body and the plurality of wheels, and the spring member is configured to be elastically deformed by a change in position of a link member of the plurality of link members relative to the body;

deriving, in response to an instruction related to a movement of the mobile robot being provided, output values by:

deriving a first output value of the drive motor based on the rotation-displacement relationship; and deriving a second output value of the steering motor based on the steering-displacement relationship; and driving the mobile robot by controlling the drive motor and the steering motor based on the output values.

2. The method of claim 1, wherein deriving the output values comprises:

calculating a horizontal-force equation of a horizontal force or a moment-of-force equation of a moment of force of the mobile robot in response to the instruction related to the movement of the mobile robot, which is related to a velocity, an acceleration, and a turning angle provided to the mobile robot in the instruction.

3. The method of claim 2, wherein deriving the output values further comprises:

calculating a vertical-force equation of a vertical force or the moment-of-force equation of the moment of force of the mobile robot in response to the instruction related to the movement of the mobile robot, which is related to the velocity, the acceleration, and the turning angle provided to the mobile robot in the instruction.

4. A method of controlling a mobile robot the method comprising:

modeling a spring property, wherein modeling the spring property comprises:

deriving a rotation-displacement relationship between an electric current value of a drive motor of the mobile robot and a displacement amount of a spring member of the mobile robot; and deriving a steering-displacement relationship between a steering angle of a steering motor of the mobile robot and the displacement amount of the spring member, wherein:

the mobile robot comprises:

a body;

a plurality of wheels;

a plurality of link members;

a plurality of spring members including the spring member;

the drive motor configured to provide rotational driving power for rotating the plurality of wheels; and the steering motor configured to provide steering driving power for steering the plurality of wheels, the plurality of link members and the plurality of spring members are configured to connect the body and the plurality of wheels, and the spring member is configured to be elastically deformed by a change in position of a link member of the plurality of link members relative to the body;

deriving, in response to an instruction related to a movement of the mobile robot being provided, output values, wherein deriving the output values comprises:

deriving a first output value of the drive motor based on the rotation-displacement relationship; and deriving a second output value of the steering motor based on the steering-displacement relationship; and driving the mobile robot by controlling the drive motor and the steering motor based on the output values, wherein the plurality of wheels comprises:

a first wheel and a second wheel provided to face each other with the body interposed therebetween; and a third wheel and a fourth wheel provided to face each other with the body interposed therebetween; and wherein deriving the rotation-displacement relationship comprises:

aligning the first wheel, the second wheel, the third wheel, and the fourth wheel; and deriving a first equilibrium value by deriving deformation amounts of the plurality of spring members in a state in which the drive motor operates the first wheel, the second wheel, the third wheel, and the fourth wheel, respectively, so that the body is in a stationary state.

5. The method of claim 4, wherein deriving the first equilibrium value comprises:

deriving a first-first equilibrium value by operating the first wheel, the second wheel, the third wheel, and the fourth wheel by the drive motor so that the body is in the stationary state;

deriving the deformation amounts of the plurality of spring members with respect to the first wheel, the second wheel, the third wheel, and the fourth wheel, respectively; and deriving the first-first equilibrium value that is a first arithmetic mean of the deformation amounts of the plurality of spring members.

6. The method of claim 5, wherein deriving the first-first equilibrium value comprises:

operating the first wheel, the second wheel, the third wheel, and the fourth wheel by the drive motor so that the body is in the stationary state;

deriving first deformation amounts of the deformation amounts of the plurality of spring members during a first process in which the electric current value of the drive motor varies until the electric current value becomes zero from A %, wherein A is a positive number;

with respect to the first wheel, the second wheel, the third wheel, and the fourth wheel, deriving second deformation amounts of the deformation amounts of the plurality of spring members during a second process in which the electric current value of the drive motor varies until the electric current value becomes zero from −A %;

calculating a first deformation arithmetic mean of the first deformation amounts of the plurality of spring members derived during the first process; and calculating a second deformation arithmetic mean of the second deformation amounts of the plurality of spring members derived during the second process.

7. The method of claim 6, wherein deriving the first equilibrium value further comprises:

deriving a first-second equilibrium value by deriving the deformation amounts of the plurality of spring members under a second condition different from a first condition existing during deriving of the first-first equilibrium value in the state in which the drive motor operates the first wheel, the second wheel, the third wheel, and the fourth wheel so that the body is in the stationary state.

8. The method of claim 7, wherein deriving the first-second equilibrium value comprises:

operating the first wheel, the second wheel, the third wheel, and the fourth wheel by the drive motor so that the body is in the stationary state;

deriving the deformation amounts of the plurality of spring members with respect to the first wheel, the second wheel, the third wheel, and the fourth wheel; and deriving the first-second equilibrium value that is a second arithmetic mean of the deformation amounts of the plurality of spring members.

9. The method of claim 8, wherein deriving the first-second equilibrium value comprises:

operating the first wheel, the second wheel, the third wheel, and the fourth wheel by the drive motor so that the body is in the stationary state;

deriving the deformation amounts of the plurality of spring members in response to the electric current value of the drive motor being zero during the first process in which the electric current value of the drive motor varies until the electric current value becomes −B % from B %, wherein B is a positive number;

with respect to the first wheel, the second wheel, the third wheel, and the fourth wheel, deriving the deformation amounts of the plurality of spring members in response to the electric current value of the drive motor being zero during the second process in which the electric current value of the drive motor varies until the electric current value becomes B % from −B %; and calculating a new arithmetic mean of the deformation amounts of the plurality of spring members derived during the first process and the deformation amounts of the plurality of spring members derived during the second process, wherein B is larger than A.

10. The method of claim 9, wherein deriving the first equilibrium value further comprises:

setting the first equilibrium value by setting another arithmetic mean of the first-first equilibrium value and the first-second equilibrium value to the first equilibrium value in response to a ratio between the first-first equilibrium value and the first-second equilibrium value being within a predetermined range.

11. The method of claim 4, wherein deriving the rotation-displacement relationship comprises:

aligning the first wheel, the second wheel, the third wheel, and the fourth wheel; and deriving a second equilibrium value by deriving the deformation amounts of the plurality of spring members in the state in which the drive motor operates the first wheel, the second wheel, the third wheel, and the fourth wheel, respectively, so that the body performs a rotational motion in place at a constant speed.

12. The method of claim 11, wherein deriving the second equilibrium value further comprises, in the state in which the body performs the rotational motion in place at the constant speed:

deriving a first-first value for each of the plurality of wheels, which is a first-first deformation amount of the deformation amounts of the plurality of spring members, while the plurality of wheels are steered by $\pi_1$, wherein $\pi_1$ is a positive number, and then steered by $-\pi_1$; and deriving a first-second value, which is a first-second deformation amount of the deformation amounts of the plurality of spring members, while the plurality of wheels are steered by $-\pi_1$ and then steered by $\pi_1$.

13. The method of claim 12, wherein deriving the second equilibrium value further comprises, when a ratio between the first-first value and the first-second value is within a first predetermined range:

deriving a second-first value, which is a second-first deformation amount of the deformation amounts of the plurality of spring members, when the plurality of wheels are steered by $\pi_2$, wherein $\pi_2$ is a positive number;

deriving a second-second value, which is a second-second deformation amount of the deformation amounts of the plurality of spring members, when the plurality of wheels are steered by $2\pi_2$; and determining whether a ratio between a difference between the second-second value and the second-first value and the second-first value is within a second predetermined range.

14. The method of claim 13, further comprising, when a ratio between a difference between a second-(n+1)th value and a second-n-th value and the second-n-th value is within a third predetermined range:

deriving a second-(n+2)th value, which is a second-(n+2)th of the deformation amounts of the plurality of spring members, when the plurality of wheels are steered by $(n+2)\pi_2$; and determining whether a ratio between a difference between the second-(n+2)th value and the second-(n+1)th value and the second-(n+1)th value is within a fourth predetermined range, wherein n is a natural number equal to or larger than 2.

15. The method of claim 12, wherein deriving the second equilibrium value further comprises, when a ratio between the first-first value and the first-second value is within a fifth predetermined range:

deriving a third-first value, which is a third-first deformation amount of the deformation amounts of the plurality of spring members, when the plurality of wheels are steered by $-\pi_2$, wherein $\pi_2$ is a positive number;

deriving a third-second value, which is a third-second deformation amount of the deformation amounts of the plurality of spring members, when the plurality of wheels are steered by $-2\pi_2$; and determining whether a ratio between a difference between the third-second value and the third-first value and the third-first value is within a sixth predetermined range.

16. The method of claim 15, further comprising, when a ratio between a difference between a third-(n+1)th value and a third-n-th value and the third-n-th value is within a seventh predetermined range:

deriving a third-(n+2)th value, which is a third-(n+2)th deformation amount of the deformation amounts of the plurality of spring members, when the plurality of wheels are steered by $-(n+2)\pi_2$; and determining whether a ratio between a difference between the third-(n+2)th value and the third-(n+1)th value and the third-(n+1)th value is within an eighth predetermined range, wherein n is a natural number equal to or larger than 2.

17. A mobile robot comprising:

a body;

a plurality of wheels provided at one side of the body;

a plurality of link members;

a plurality of spring members, wherein the plurality of link members and the plurality of spring members are configured to connect the body and the plurality of wheels;

a drive motor configured to provide rotational driving power for rotating the plurality of wheels;

a steering motor configured to provide steering driving power for steering the plurality of wheels, wherein:
a spring member of the plurality of spring members is configured to be elastically deformed by a change in position of a link member of the plurality of link members relative to the body, and
the plurality of link members comprise a first link member and a second link member each having one side rotatably connected to the body, and the other side rotatably connected to a wheel of the plurality of wheels; and
a controller configured to:
model a spring property, wherein, to model the spring property, the controller is configured to:
derive a rotation-displacement relationship between an electric current value of the drive motor and a displacement amount of the spring member and
derive a steering-displacement relationship between a rotation angle of the steering motor and the displacement amount of the spring member;
derive, in response to an instruction related to a movement of the mobile robot being provided, output values, wherein, to derive the output values, the controller is configured to:
derive a first output value of the drive motor based on the rotation-displacement relationship; and
derive a second output value based on the steering-displacement relationship; and
drive the mobile robot, wherein, to drive the mobile robot, the controller is configured to:
control the drive motor and the steering motor based on the output values.

18. The mobile robot of claim 17, wherein the spring member is provided in a region of the first link member that is rotatably connected to the body.

19. The mobile robot of claim 17, wherein the first link member and the second link member are provided in parallel with each other.

* * * * *